US012792945B2

(12) United States Patent
Ethier-Majcher et al.

(10) Patent No.: US 12,792,945 B2
(45) Date of Patent: Nov. 10, 2026

(54) METHODS FOR DETERMINING A PARAMETER OF A COUPLING ELEMENT IN A QUANTUM CIRCUIT

(71) Applicant: ANYON SYSTEMS INC., Dorval (CA)

(72) Inventors: Gabriel Ethier-Majcher, Montreal (CA); Clauderic Ouellet-Plamondon, Montreal (CA); Paul Leroux, Dorval (CA); Marcelo Wu, Dorval (CA)

(73) Assignee: ANYON SYSTEMS INC., Dorval (CA)

( * ) Notice: Subject to any disclaimer, the term of this patent is extended or adjusted under 35 U.S.C. 154(b) by 189 days.

(21) Appl. No.: 18/655,048

(22) Filed: May 3, 2024

(65) Prior Publication Data

US 2025/0328794 A1 Oct. 23, 2025

Related U.S. Application Data

(60) Provisional application No. 63/500,366, filed on May 5, 2023.

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
CPC ................................ G06N 10/20; G06N 10/40
USPC ...................... 326/2; 257/31; 505/210; 713/1
See application file for complete search history.

(56) References Cited

U.S. PATENT DOCUMENTS

| | | | |
|---|---|---|---|
| 10,223,643 | B1 | 3/2019 | Bishop et al. |
| 10,862,465 | B1 | 12/2020 | Cohen et al. |
| 10,922,166 | B2 | 2/2021 | Hogaboam |
| 11,087,233 | B2 | 8/2021 | Martinis et al. |
| 11,164,103 | B2 | 11/2021 | Bloom et al. |
| 11,200,508 | B2 | 12/2021 | Reagor et al. |
| 11,237,454 | B2 | 2/2022 | Carolan et al. |
| 11,374,594 | B2 | 6/2022 | Hogaboam et al. |
| 11,562,280 | B2 | 1/2023 | Martinis et al. |
| 2009/0259905 | A1 | 10/2009 | Silva et al. |

(Continued)

OTHER PUBLICATIONS

Zhang et al, "Characterization of tunable coupler without a dedicated readout resonator in superconducting circuits"; Appl. Phys. Lett. 122, 024001 (2023); doi: 10.1063/5.0135219 Submitted: Nov. 17, 2022 . Accepted: Dec. 18, 2022 .Published Online: Jan. 9, 2023 (Year: 2023).*

(Continued)

*Primary Examiner* — Arnold M Kinkead
(74) *Attorney, Agent, or Firm* — NORTON ROSE FULBRIGHT CANADA LLP

(57) ABSTRACT

There is described herein a method for determining a parameter of a coupling element in a quantum circuit, the quantum circuit comprising a qubit, the coupling element coupled to the qubit, and a readout element. The qubit or the readout element is selected as a probing element. A frequency of the qubit is tuned and a measurement of a parameter of the probing element is performed on the readout element while an effective coupling rate of the probing element and the coupling element is in the strong coupling regime. The parameter of the coupling element is determined from the parameter of the probing element.

20 Claims, 18 Drawing Sheets

(56) References Cited

U.S. PATENT DOCUMENTS

| | | | |
|---|---|---|---|
| 2014/0229722 | A1 | 8/2014 | Harris |
| 2017/0357561 | A1 | 12/2017 | Kelly |
| 2020/0242502 | A1 | 7/2020 | Chen et al. |
| 2020/0250568 | A1 | 8/2020 | Hua |
| 2020/0311220 | A1 | 10/2020 | Gunnels et al. |
| 2020/0387822 | A1 | 12/2020 | Kilmov |
| 2020/0394524 | A1 | 12/2020 | Vainsencher et al. |
| 2021/0035005 | A1 | 2/2021 | Martinis et al. |
| 2021/0049482 | A1 | 2/2021 | Mezzacapo et al. |
| 2021/0081816 | A1 | 3/2021 | Klimov et al. |
| 2021/0173660 | A1 | 6/2021 | Hogaboam et al. |
| 2021/0182071 | A1 | 6/2021 | Khammassi |
| 2021/0279625 | A1 | 9/2021 | Shani et al. |
| 2021/0313973 | A1 | 10/2021 | Cohen et al. |
| 2021/0342727 | A1 | 11/2021 | Chakraborty et al. |
| 2021/0342730 | A1 | 11/2021 | Redmond et al. |
| 2022/0019927 | A1 | 1/2022 | Lauer |
| 2022/0027773 | A1 | 1/2022 | Smelyanskiy et al. |
| 2022/0149823 | A1 | 5/2022 | Redmond et al. |
| 2022/0188500 | A1 | 6/2022 | Joshi et al. |
| 2022/0199888 | A1 | 6/2022 | Daraeizadeh et al. |
| 2022/0206866 | A1 | 6/2022 | Maksymov et al. |
| 2023/0029092 | A1 | 1/2023 | Klimov |
| 2023/0054391 | A1 | 2/2023 | Wang |

OTHER PUBLICATIONS

Collodo et al., Implementation of Conditional-Phase Gates based on tunable ZZ-Interactions, Phys. Rev. Lett. 125, 240502 (2020).

Foxen et al., Demonstrating a Continuous Set of Two-Qubit Gates for Near-Term Quantum Algorithms, Phys. Rev. Lett. 125, 120504 (2020).

Li et al., Tunable coupler for realizing a controlled-phase gate with dynamically decoupled regime in a superconducting circuit, Phys. Rev. Applied 14, 024070 (2020).

Sung et al., Realization of High-Fidelity CZ and ZZ-Free iSWAP Gates with a Tunable Coupler, Phys. Rev. X 11, 021058 (2021).

Zhang et al., Characterization of Tunable Coupler without a Dedicated Read-Out Resonator in Superconducting Units, Appl. Phys. Lett. 122, 024001 (2023).

* cited by examiner

METHODS FOR DETERMINING A PARAMETER OF A COUPLING ELEMENT IN A QUANTUM CIRCUIT

CROSS-REFERENCE TO RELATED APPLICATIONS

The present application claims the benefit of U.S. Provisional Patent Application No. 63/500,366 filed on May 5, 2023, the contents of which are hereby incorporated by reference in their entirety.

TECHNICAL FIELD

The present disclosure generally relates to quantum circuits and more particularly, to quantum circuits having qubits and coupling elements and how to determine parameters of the coupling element.

BACKGROUND OF THE ART

Quantum computers are machines that harness the properties of quantum states, such as superposition, interference, and entanglement, to perform computations. In a quantum computer, the basic unit of memory is a quantum bit, or qubit. A quantum computer with enough qubits has a computational power inaccessible to a classical computer, which is referred to as "quantum advantage".

A significant challenge in quantum computation is the sensitivity of the quantum information to noise. The integrity of the quantum information is limited by the coherence time of the qubits and errors in the quantum gate operations, both of which are affected by the environmental noise. Calibration is a technique to reduce systematic errors in quantum circuits. Circuit specific calibrations reduce gate errors for specific circuits. Proper calibration requires knowledge of many circuit parameters, some of which are more challenging to obtain as they cannot be directly measured.

SUMMARY

In accordance with a first broad aspect, there is provided a method for determining a parameter of a coupling element in a quantum circuit, the quantum circuit comprising a qubit, the coupling element coupled to the qubit, and a readout element associated with the qubit. The method comprises selecting the qubit or the readout element as a probing element, tuning a frequency of the qubit, performing a measurement of a parameter of the probing element on the readout element while an effective coupling rate of the probing element and the coupling element is in the strong coupling regime, and determining the parameter of the coupling element from the parameter of the probing element.

In accordance with another broad aspect, there is provided a method for determining a quantum state of a coupling element in a quantum circuit, the quantum circuit comprising the coupling element, a qubit coupled to the coupling element, and a readout element associated with the qubit. The method comprises tuning a frequency of the qubit to bring an effective coupling rate between the coupling element and the readout element to at least a lower threshold of a strong coupling regime, performing a measurement of a parameter of the readout element while the effective coupling rate of the readout element and the coupling element is in the strong coupling regime, and determining the quantum state of the coupling element from the parameter of the readout element.

In accordance with yet another broad aspect, there is provided a method for determining a frequency of a coupling element in a quantum circuit, the quantum circuit comprising the coupling element, a qubit coupled to the coupling element, and a readout element associated with the qubit. The method comprises tuning a frequency of the qubit to bring an effective coupling rate between the coupling element and the readout element to at least a lower threshold of a strong coupling regime, and varying a frequency-changing signal applied to the coupling element while the effective coupling rate of the coupling element and the readout element is in the strong coupling regime. A measurement is performed on the readout element as a function of the varying frequency-changing signal, and the frequency of the coupling element is determined based on the readout.

In accordance with another broad aspect, there is provided a method for determining flux pulse distortion of a coupling element in a quantum circuit, the quantum circuit comprising the coupling element, a qubit coupled to the coupling element, and a readout element associated with the qubit. The method comprises tuning a frequency of the qubit to where the frequency of the qubit is sensitive to a frequency of the coupler, applying a frequency-changing signal to the coupler and measuring the frequency of the qubit over time after application of the frequency-changing signal to the coupler. The frequency of the qubit over time is used with a calibration curve to determine a reconstruction of the frequency-changing signal over time. The reconstruction of the frequency-changing signal is compared to an expected frequency-changing signal over time to determine flux pulse distortion of the coupling element.

In accordance with yet another broad aspect, there is provided a method for determine flux crosstalk to a coupling element in a quantum circuit from a target element in the quantum circuit, the quantum circuit comprising the coupling element, a qubit coupled to the coupling element, and a readout element associated with the qubit. The method comprises tuning a frequency of the qubit to where the frequency of the qubit is sensitive to a frequency of the coupler, applying frequency-changing signals to the target element and measuring corresponding frequencies of the qubit. A mapping of the qubit frequencies to the frequency-changing signals of the target element and a calibration curve are used to determine the flux crosstalk to the coupling element.

Features of the systems, devices, and methods described herein may be used in various combinations, in accordance with the embodiments described herein.

BRIEF DESCRIPTION OF THE DRAWINGS

Reference is now made to the drawings, in which.

DETAILED DESCRIPTION

Figure 1:
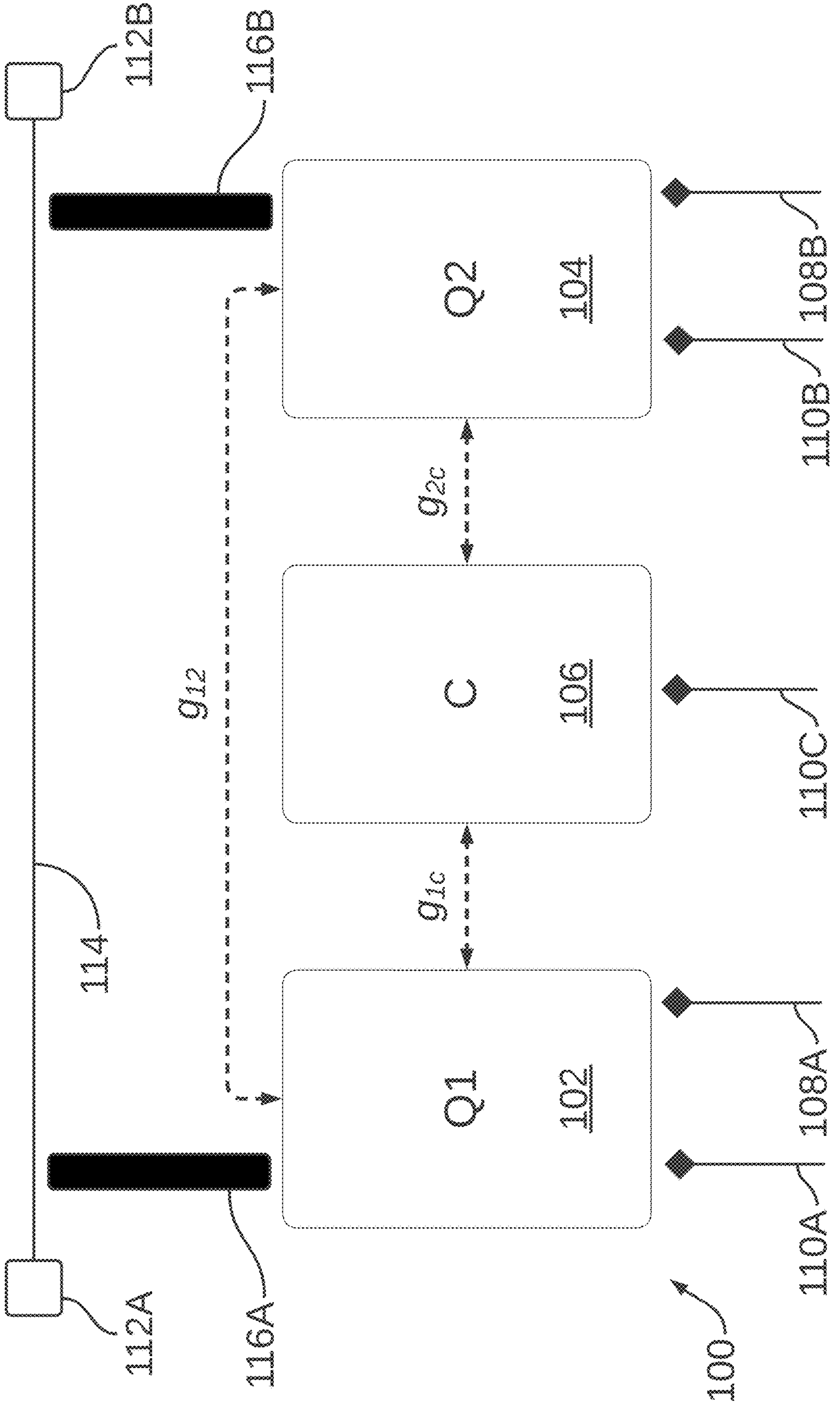
FIG. 1 is a schematic diagram of a quantum circuit.

The present disclosure is directed to methods for measuring a parameter of a coupling element of a quantum circuit. A quantum circuit includes data qubits on which quantum algorithms are performed, coupling elements to generate entanglement between qubits, and readout elements to readout the state of the qubits. With reference to FIG. 1, there is illustrated an example of a quantum circuit 100 composed of a first qubit 102, a second qubit 104, and a coupling element (referred to as a coupler herein) 106. The first qubit 102 is directly coupled to the coupler 106 via a coupling rate $g_{1c}$, which may involve capacitive coupling, inductive coupling, or other known coupling types. The second qubit 104 is directly coupled to the coupler 106 via a coupling rate $g_{2c}$, which may involve capacitive coupling, inductive coupling, or other known coupling types. First and second qubits 102, 104 are also directly coupled via a coupling rate $g_{12}$, which may involve capacitive coupling, inductive coupling, or other known coupling types.

In some embodiments, the qubits 102, 104 are superconducting qubits, such as but not limited to charge qubits, flux qubits, phase qubits, and the like. In some embodiments, the qubits 102, 104 are transmon qubits or differential transmon qubits. In other embodiments, the qubits 102, 104 are spin qubits, fluxonium qubits, or any quantum object having a plurality of discrete levels out of which at least two levels can be selectively addressed.

The qubits 102, 104 may be fixed-frequency qubits or frequency-tunable qubits. Each qubit 102, 104 may be associated with one or more transmission line for control thereof. The transmission lines may be used to perform gating operations on one or more of the qubits 102, 104 by transmitting signals thereto. In this case, the transmission lines may be called "gate lines" 108A, 108B. When the qubits are frequency-tunable, transmission lines may also be used to tune the frequency of the qubits. In this case, the transmission lines may be called "flux lines" 110A, 110B. Separate gate lines 108A, 108B and flux lines 110A, 110B may be provided, as shown in FIG. 1. Alternatively, a single transmission line (i.e., 108A or 110A; 108B or 110B) may be used for both gating and frequency tuning of a respective qubit 102, 104. Fixed-frequency qubits may have a single transmission line (i.e., 108A or 110A; 108B or 110B) used for gating.

Qubits 102, 104 may be data qubits, for example in a quantum processor. Coupler 106 may also be implemented as a qubit. In some embodiments, coupler 106 has the same architecture as the data qubits 102, 104. However, qubits 102, 104 and coupler 106 need not be of the same type. For example, coupler 106 may be a transmon qubit while qubits 102, 104 may be flux qubits or fluxonium qubits. Other embodiments may also apply. Coupler 106 may be a frequency-tunable coupler. The frequency of coupler 106 may be tuned by applying a frequency-changing signal to a transmission line 110C associated with the coupler 106.

There are generally two parameters that are of interest for elements in a quantum circuit: frequency and quantum state (i.e. 0 or 1). These parameters, as they relate to qubits, may be determined using readout elements composed of resonators and readout transmission lines. In this example, readout resonators 116A, 116B are associated with a respective qubit 102, 104. Each readout resonator 116A, 116B is associated with a readout transmission line 114 having an input port 112A for sending an input signal and an output port 112B for receiving an output signal. Note that a single port of the readout transmission line 114 may be used for both input and output. In such a case, an input signal is applied at a port of the readout transmission line 114 and a reflection of the input signal is measured as the output signal at the same port. As used herein, the expression "performing a readout" encompasses the steps of applying one or more input signal at a port of a readout transmission line and subsequently measuring one or more output signal at the same or a different port of the readout transmission line. Additional processing steps of the raw data as measured may also be included in performing the readout. The example of FIG. 1 illustrates readout resonators 116A, 116B connected to a single readout transmission line 114. Alternatively, each readout resonator 116A, 116B may be associated with a separate readout transmission line.

The quantum state of a qubit, for example qubit 102, can be determined by performing a readout on the readout transmission line 114. An input signal is applied at the input port 112A, at a frequency $F_1$ associated with a resonant frequency of the resonator 116A. The phase and amplitude of the output signal measured by performing a readout is indicative of the quantum state of the qubit 102. The same procedure may be applied to qubit 104 by sending a signal on the readout transmission line 114 at the input port 112A at a frequency $F_2$ associated with a resonant frequency of the resonator 116B and determining the phase and amplitude of the output by performing a readout. Therefore, the quantum state of qubits 102, 104 may be directly measured via the resonators 116A, 116B, respectively.

The frequency of a qubit can be determined using qubit spectroscopy. For example, the frequency of qubit 102 can be determined by fixing one of a gating signal on gate line 108A and a frequency signal on flux line 110A, varying the other one of the gating signal on gate line 108A and the frequency signal on flux line 110A, and performing a readout on the readout transmission line 114. This experiment is repeated multiple times by varying the frequency signal on flux line 110A, in order to measure the impact of the coupler 106 on the qubit 102 and extrapolate the frequency of the qubit 102. Similarly, the frequency of qubit 104 is determined by fixing one of a gating signal on gate line 108B and a frequency signal on flux line 110B, varying the other one of the gating signal on gate line 108B and the frequency signal on flux line 110B, and performing a readout on the readout transmission line 114 for different frequencies applied to the coupler 106 through flux line 110C. Therefore, the frequency of the qubits 102, 104 may be directly measured via the resonators 116A, 116B, respectively, using gate lines 108A, 108B and flux lines 110A, 110B, respectively, and flux line 110C.

Couplers do not typically have a gate line since gating operations are performed on qubits. In addition, certain quantum circuit designs include resonators associated directly with couplers, but this is not a scalable approach due to space constraints when the number of qubits and couplers in a circuit increases. This makes determining the quantum state and the frequency of the coupler 106 challenging, as these parameters cannot be obtained directly and with the same precision as they can for qubits 102, 104. However, the frequency and quantum state of the coupler 106 are needed for proper calibration of the circuit 100.

Figure 2:
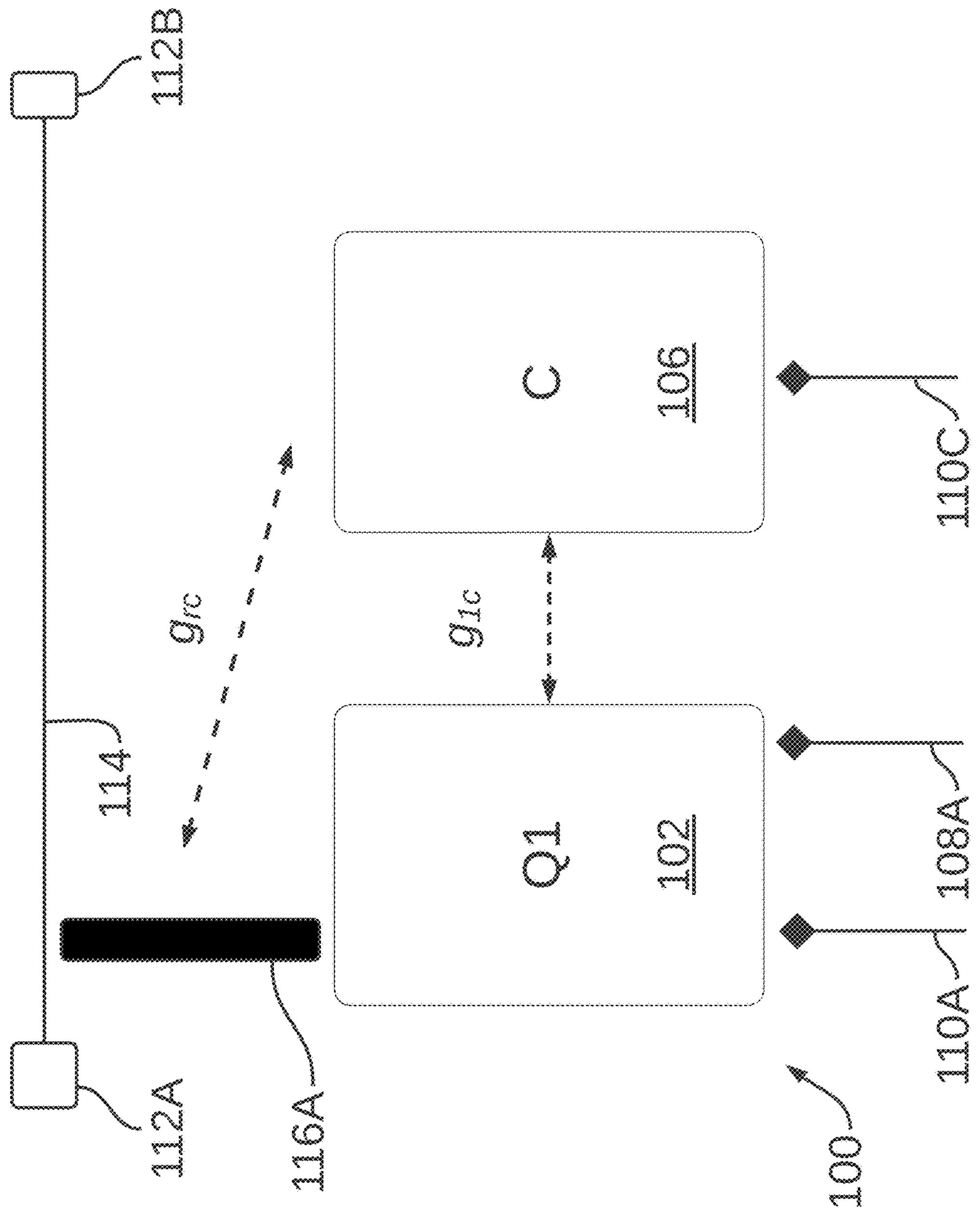
FIG. 2 is an enhanced view of a portion of the quantum circuit of FIG. 1.

With reference to FIG. 2, the embodiments described herein propose to use a qubit or a readout resonator as a probing element in order to determine a parameter of the coupler. That is to say, the probing element is "probed", or measured, and a dependency or sensitivity between the probing element and the coupler is used to determine a coupler parameter. The qubit 102 in the quantum circuit 100 may be used as a tunable coupling element in the circuit 100. In some embodiments, the qubit 102 is used to tune the coupling between the resonator 116A and the coupler 106. In some embodiments, qubit tuning is used to bring the qubit 102 and the coupler 106 close to resonance, such that the qubit frequency strongly depends on the coupler frequency. The coupling between the coupler 106 and the qubit 102 or the resonator 116A is tuned by applying a frequency-tuning signal to the qubit 102 through flux line 110A.

The qubit may be tuned to bring an effective coupling rate between the probing element and the coupler to at least a lower threshold of a strong coupling regime. For example, if the readout resonator 116A is selected as the probing element, the qubit 102 is used to tune an effective coupling rate $g_{rc}$ between the resonator 116A and the coupler 106. If the qubit 102 is selected as the probing element, qubit tuning is used to bring the qubit 102 and the coupler 106 close to resonance, such that the qubit frequency strongly depends on the coupler frequency. The measurement of the probing element is taken when the coupler and probing element are in a strong coupling regime, thus creating the dependency that allows a coupler parameter to be determined from a parameter of the probing element.

As used herein, the expression "strong coupling regime" is understood to mean that the effective coupling rate between the coupler 106 and the probing element (e.g. resonator 116A or qubit 102) is greater than a decay rate (κ) or relaxation rate $$\left(\frac{1}{T_1}\right)$$

of the probing element and a relaxation rate $$\left(\frac{1}{T_1}\right)$$

of the coupler 106, where $T_1$ is the coherence time of the coupler 106 or the qubit 102. In other words, the following condition must be met:

$$\text{effective coupling rate} > \kappa, \frac{1}{T_1}.$$

In some embodiments, the qubit 102 is used as a tunable coupling element between the readout resonator 116A and the coupler 106. The frequency of the qubit 102 is tuned by applying a frequency-changing signal (i.e. a current to vary a magnetic flux or a voltage to vary a Josephson energy) to flux line 110A, thus varying the effective coupling rate $g_{rc}$ between the readout resonator 116A and the coupler 106. Placing the coupler 106 in a strong coupling regime with the probing element, in this case the resonator 116A, causes the resonator to have an increased sensitivity to changes in the coupler 106. This sensitivity can be used to extract the coupler frequency or quantum state of the coupler 106 from the frequency of the resonator.

Figure 3:
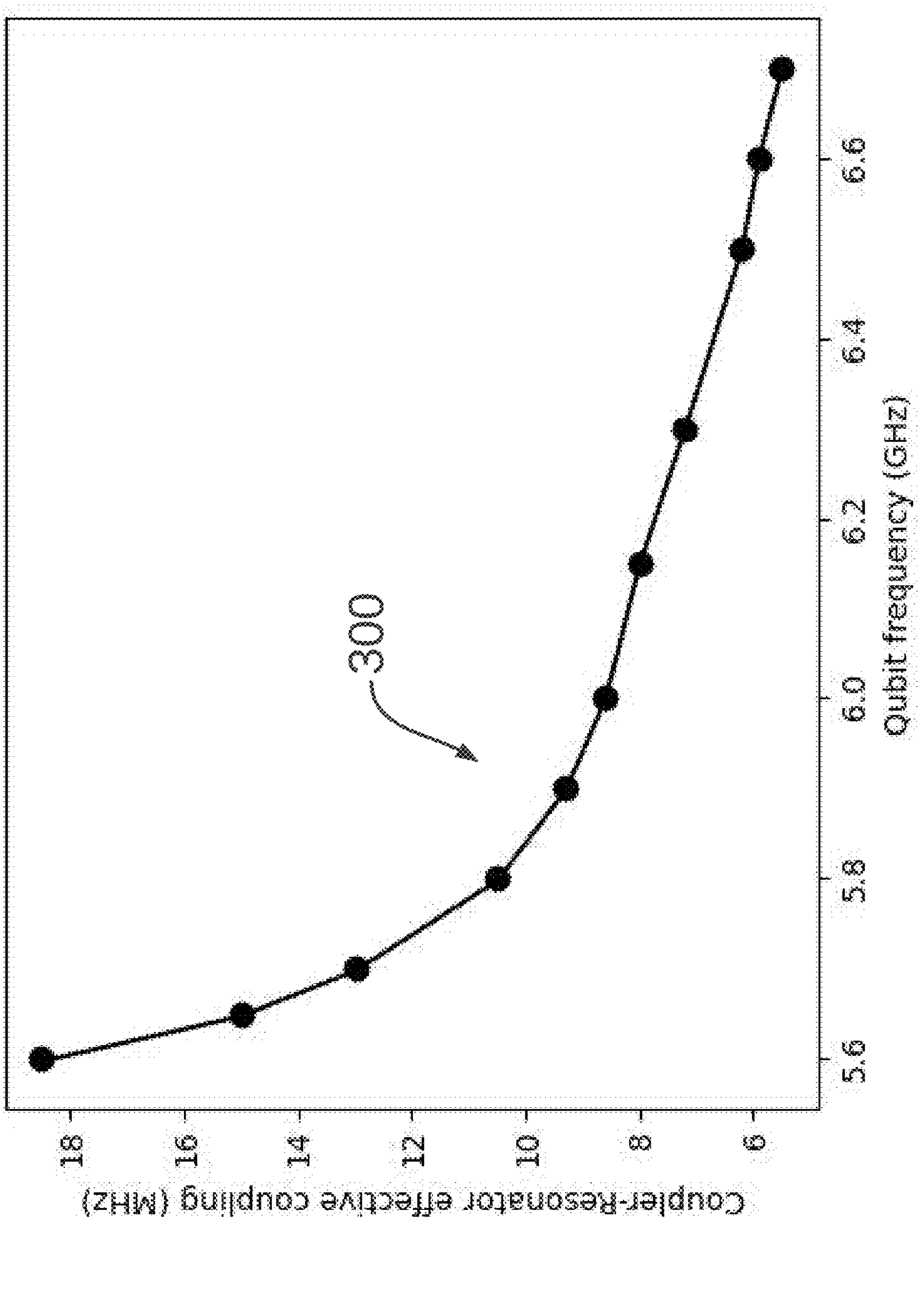
FIG. 3 is a graph showing a relationship between the frequency of a qubit and the effective coupling rate between a coupler and a resonator.

As shown in the curve 300 of FIG. 3, the effective coupling rate $g_{rc}$ (y-axis) is dependent on the frequency of the qubit 102 (x-axis). Therefore, the effective coupling rate between the resonator 116A and the coupler 106 may be increased by changing the frequency of the qubit 102 relative to the frequencies of the coupler 106 and resonator 116A.

Figure 4:
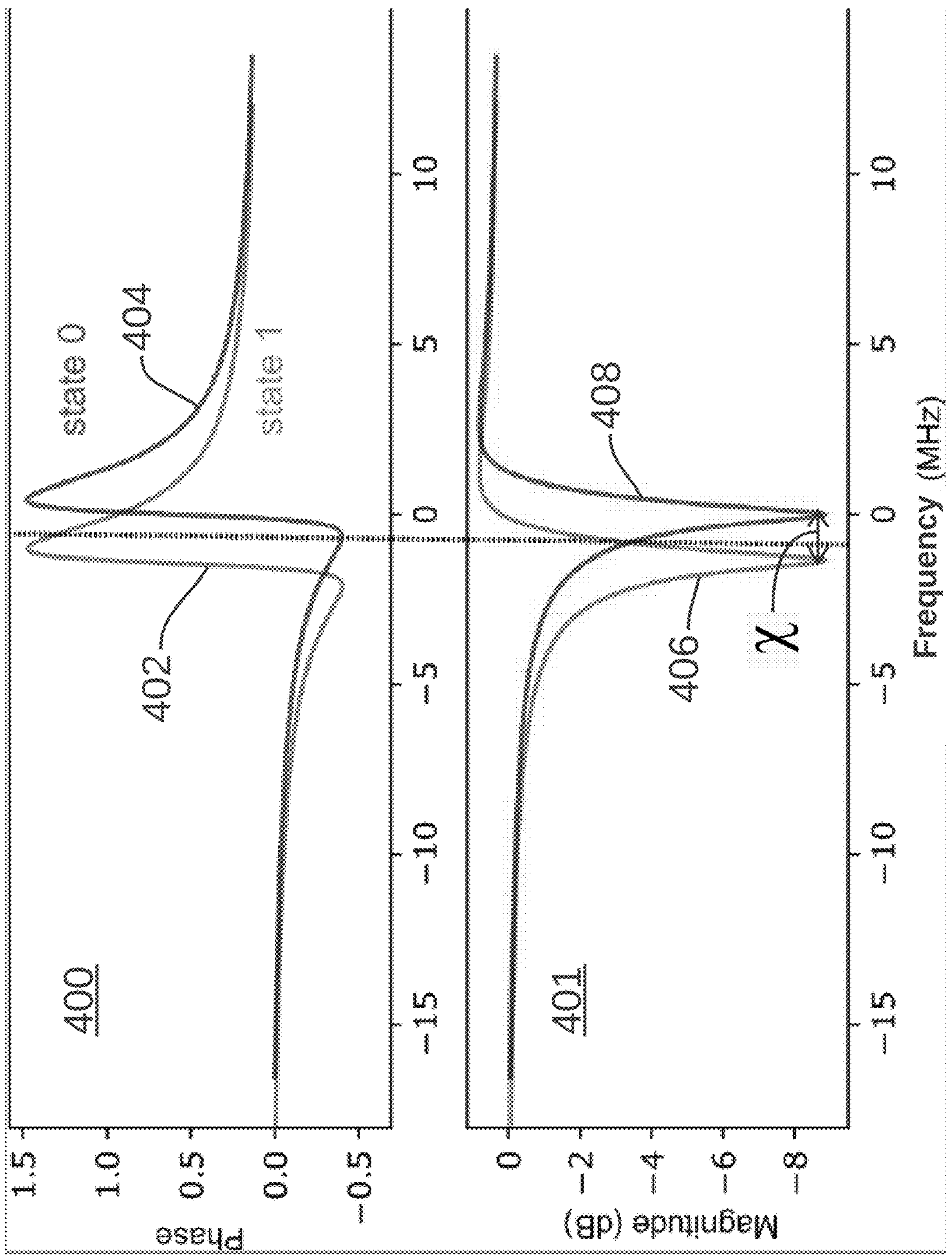
FIG. 4 is a graph showing a relationship between the phase and amplitude of a readout signal and the quantum state of a coupler.

In some embodiments, the quantum state (also known as the population) of the coupler 106 may be determined by performing a readout on the readout transmission line 114 while the effective coupling rate $g_{rc}$ between the coupler 106 and the resonator 116A is in the strong coupling regime. Examples of the readout are shown in FIG. 4. Graphs 400 and 401 illustrate the amplitude and phase components of the readout signal for two quantum states of the coupler 106, namely state 0 (ground state) and state 1 (first excited state). Curves 402, 406 are example readouts on the readout transmission line 114 when coupler 106 is in the first excited state, curves 404, 408 are example readouts on the readout transmission line 114 when coupler 106 is in the ground state. A frequency shift occurs in the resonator 116A when the quantum state of the coupler 106 changes. This frequency shift is reflected in the magnitude and the phase of the readout signal. FIG. 4 illustrates a negative frequency shift when the coupler state changes from state 0 to state 1. The readout signal may thus be used to determine the quantum state of the coupler 106.

In some embodiments, the frequency of the coupler 106 may be determined by performing a measurement on the readout transmission line 114 while the effective coupling rate $g_{rc}$ between the coupler 106 and the resonator 116A is in the strong coupling regime, and as a frequency-changing signal applied to the coupler 106 is varied. In other words, signals of varying voltage (or current) are applied to the coupler 106 through flux line 110C in order to shift the coupler frequency while the effective coupling rate $g_{rc}$ between the coupler 106 and the resonator 116A is in the strong coupling regime, thus inducing a frequency shift in the resonator 116A. A readout is performed at the readout transmission line 114 for multiple voltage (or current) levels of the frequency-changing signal applied to the coupler 106 and the measured output is indicative of the frequency of the resonator 116A. With the coupler 106 and resonator 116A in a strong coupling regime, the coupler frequency can be determined from the resonator frequency, as a function of the frequency-changing signal applied to the coupler 106.

Figure 5:
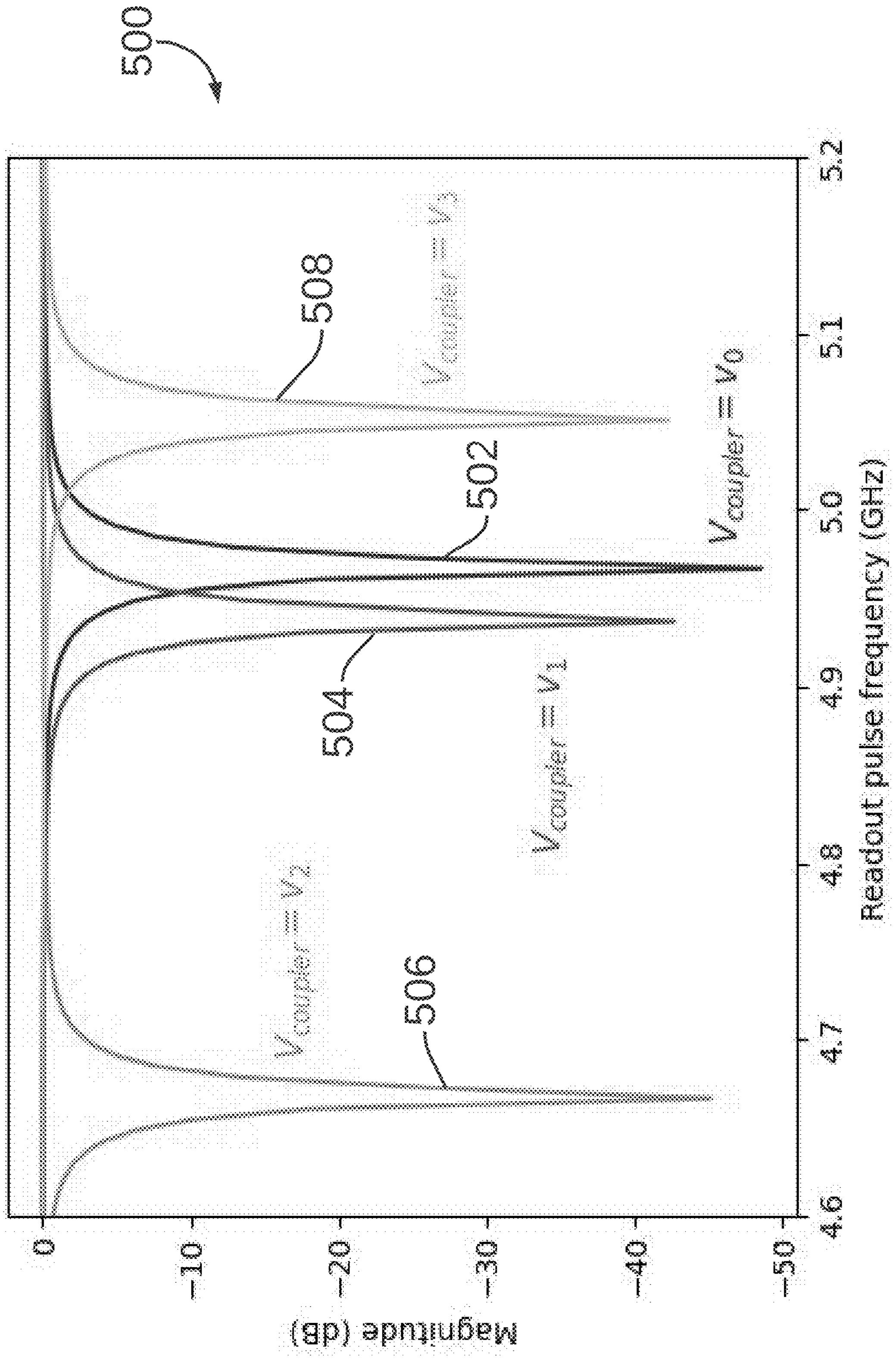
FIG. 5 is a graph showing a relationship between the magnitude of a readout signal measured on a readout transmission line and a magnetic flux applied to a coupler.
Figure 6:
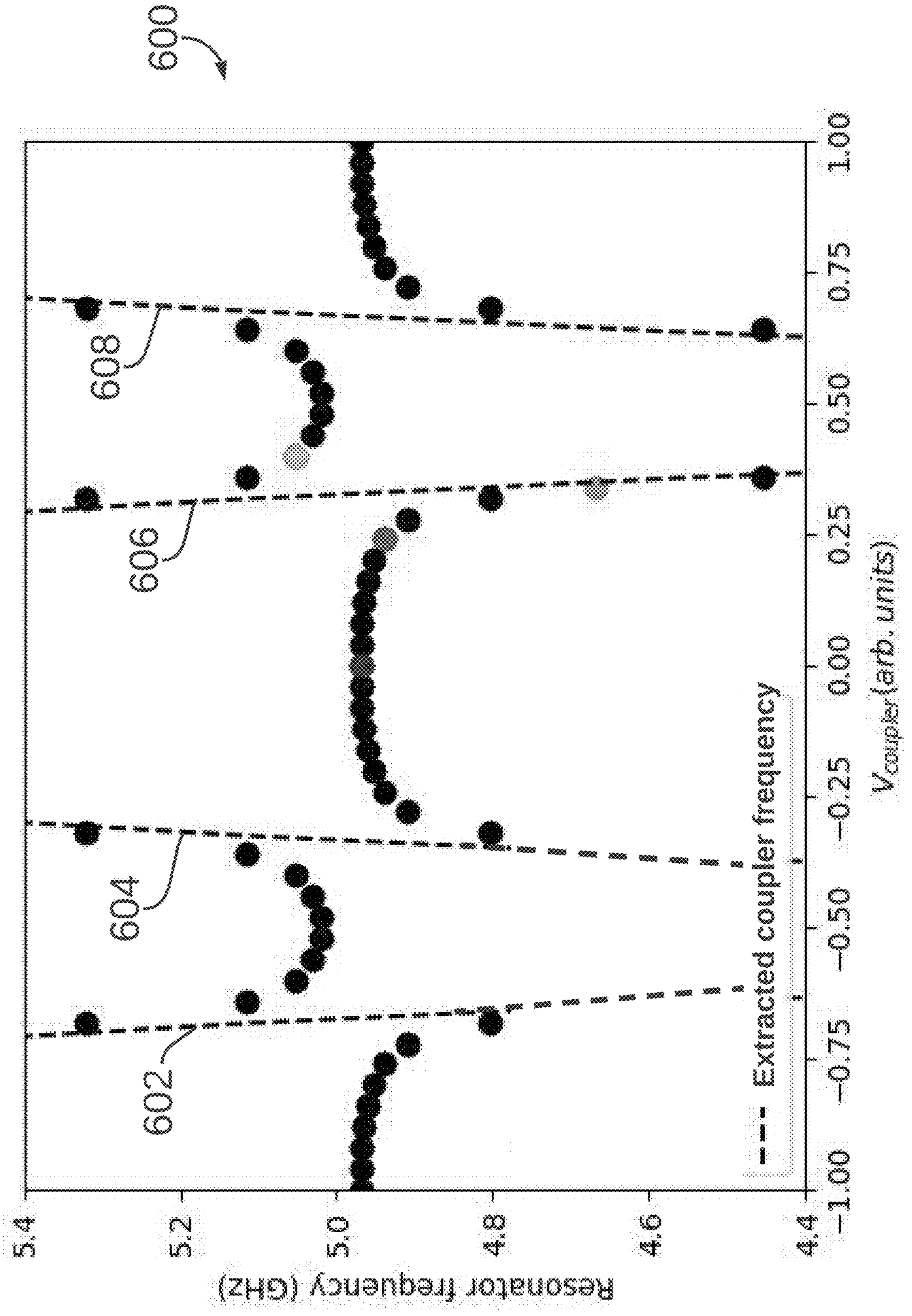
FIG. 6 is a graph showing a relationship between a resonator frequency and a flux applied to a coupler.

With reference to FIG. 5, a graph 500 shows example curves 502, 504, 506, 508. Each curve 502, 504, 506, 508 represents a readout resonator spectrum as measured from the readout transmission line 114 for a given level of a frequency-changing signal (V0, V1, V2, V3) applied to the coupler 106 via the flux line 110C. As shown, varying the frequency-changing signal applied to the coupler 106 causes a change in a resonance frequency of the resonator 116A, illustrated by the shifts along the x-axis of the dips in curves 502, 504, 506, 508. These resonance frequencies can be used to determine the frequency of the coupler 106 by mapping the resonator frequencies to the various levels of the frequency-changing signal applied to the coupler 106. As shown in the example graph 600 of FIG. 6, when the resonator frequencies (y-axis) are mapped to the applied signals (x-axis), they reveal "avoided crossings" 602, 604, 606, 608, which indicate that the coupler 106 and the resonator 116A are in resonance. The frequency of the coupler 106 can therefore be determined from the frequency of the resonator 116A for any applied frequency-changing signal.

In order to measure the quantum state or the frequency of the coupler using the methods described herein, the minimal requirement is to achieve the lower threshold of the strong coupling regime ($g_{rc}>\kappa$, assuming $$\frac{1}{T_1} \gg \kappa)$$

between the readout resonator and the coupler. However, increasing the effective coupling rate $g_{rc}$ between the readout resonator and the coupler beyond the lower threshold of the strong coupling regime increases the sensitivity of the readout resonator frequency to the coupler frequency and can thus allow a faster and more precise measurement of the frequency or quantum state of the coupler. Therefore, in some embodiments, an effective coupling rate of $g_{rc}>(M*\kappa)$ is used, where M is between 10 and 50, to allow for fast calibration of a coupler parameter.

The proposed approach of creating a controllable coupling between the resonator and the coupler using the qubit addresses many drawbacks of the prior art in determining frequency and quantum state of a coupler. For one, it is scalable to larger quantum processors, contrary to the approach of directly connecting a resonator to a coupler for readout. In addition, the proposed approach does not require performing a gate on the qubit, which greatly simplifies the process. Finally, the proposed approach significantly reduces the time needed to determine the coupler parameters.

The frequency and quantum state of the coupler may be used in various aspects of calibrating and characterizing quantum circuits and/or quantum processors, to optimize the accuracy and/or fidelity of quantum computations. For example, mapping the coupler frequency vs coupler flux allows single qubits to be isolated from neighboring qubits and couplers. Isolating of qubits is used to determine the optimal operating frequencies of the quantum processor. In another example, the quantum state of the coupler may be used to calibrate distortions on coupler flux lines. This experiment is performed by measuring the phase of the coupler quantum state as a function of time after a signal is applied to the coupler to induce a magnetic flux, and using the proportionality of the phase of the coupler to the frequency of the coupler in order to reconstruct the coupler frequency as a function of time. The coupler frequency vs coupler flux may then be used to reconstruct the current in the coupler flux line as a function of time.

The frequency and quantum state of the coupler can also be used for precise calibration of a two-qubit gate. For example, the coupler 106 may be used to tune the effective coupling rate $g_{12}$ between qubit 102 and qubit 104, which enables fast two-qubit gates. An iSwap or a controlled-phase gate can be performed between qubit 102 and qubit 104 by tuning the frequency of the coupler 106. Furthermore, leakage of qubit population to the coupler 106 during the two-qubit gate is detrimental to the fidelity of the gate. This leakage can be quantified by measuring the quantum state of the coupler 106 at the end of the two-qubit gate, and minimized through proper calibration.

In some embodiments, the qubit 102 is used as a probe of the coupler 106. In this case, the coupling rate between the qubit and the coupler is fixed by their capacitive coupling and thus naturally in the strong coupling regime. However, the frequency of the qubit 102 is tuned by applying a frequency-changing signal to flux line 110A to bring the coupler 106 and the qubit 102 close to resonance. In other words, the qubit is tuned to a frequency where the frequency of the qubit strongly depends on the frequency of the coupler. This dependence can be used to determine effects such as coupler flux pulse distortion or crosstalk effects on the coupler from neighboring elements in the quantum circuit.

Figure 7:
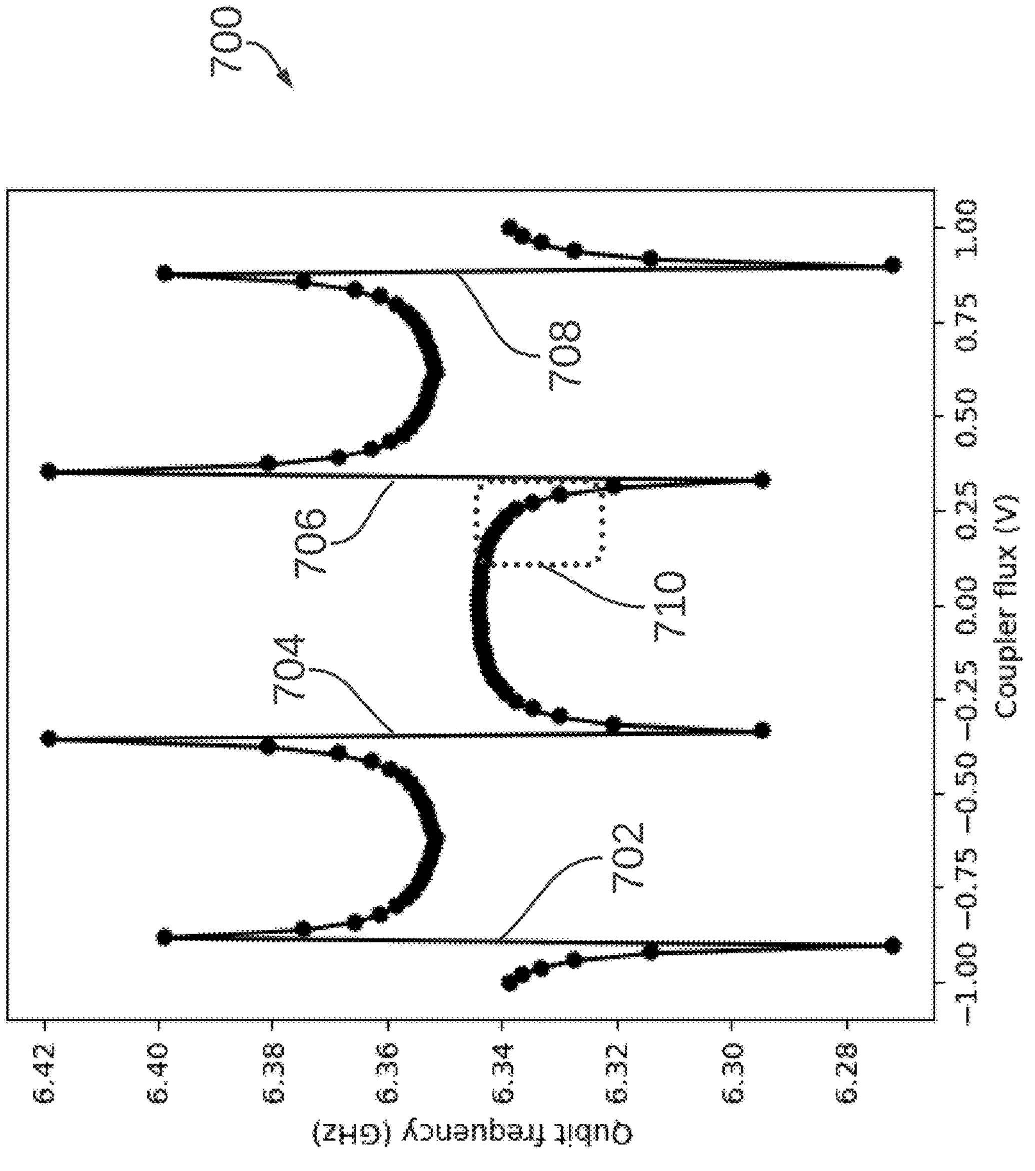
FIG. 7 is a graph showing a relationship between a qubit frequency and a flux applied to a coupler.

When the strong dependence between the coupler and the qubit frequencies is present, a frequency-changing signal is applied to the coupler via flux line 110C and the frequency of the qubit 102 is measured. FIG. 7 is an example graph 700 mapping the measured qubit frequencies (y-axis) to the frequency-changing signal applied to the coupler (x-axis—also called the coupler flux signal) while the coupler and qubit are in the strong coupling regime. The sensitivity of the qubit frequency to changes in the coupler flux is maximized close to the "avoided crossings" 702, 704, 706, 708, which are the points at which the coupler frequency becomes comparable to the qubit frequency. A sample region 710 of the graph 700 is expanded in FIG. 8. The resulting curve 800 becomes a calibration curve for the flux pulse distortion and/or crosstalk effects on the coupler.

Figure 9:
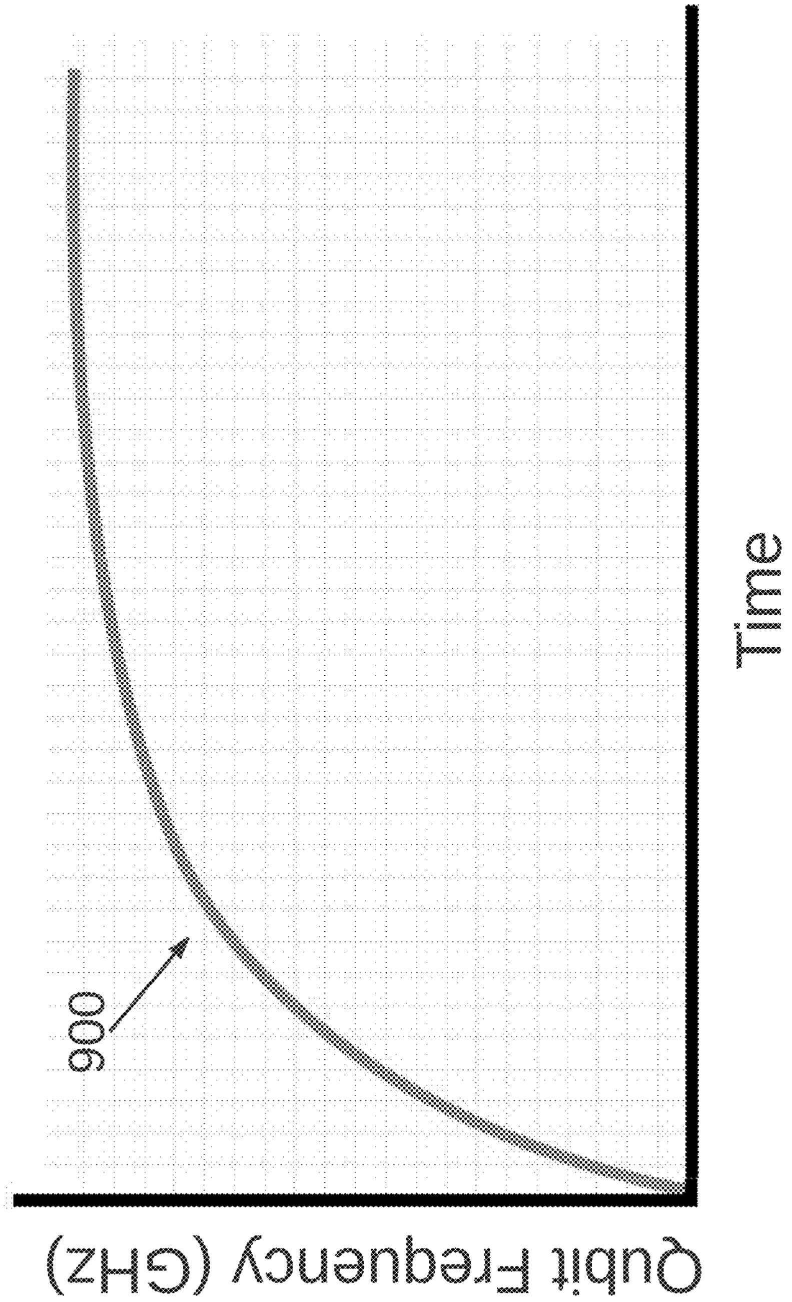
FIG. 9 is a graph showing an example measurement of qubit frequency over time.
Figure 10:
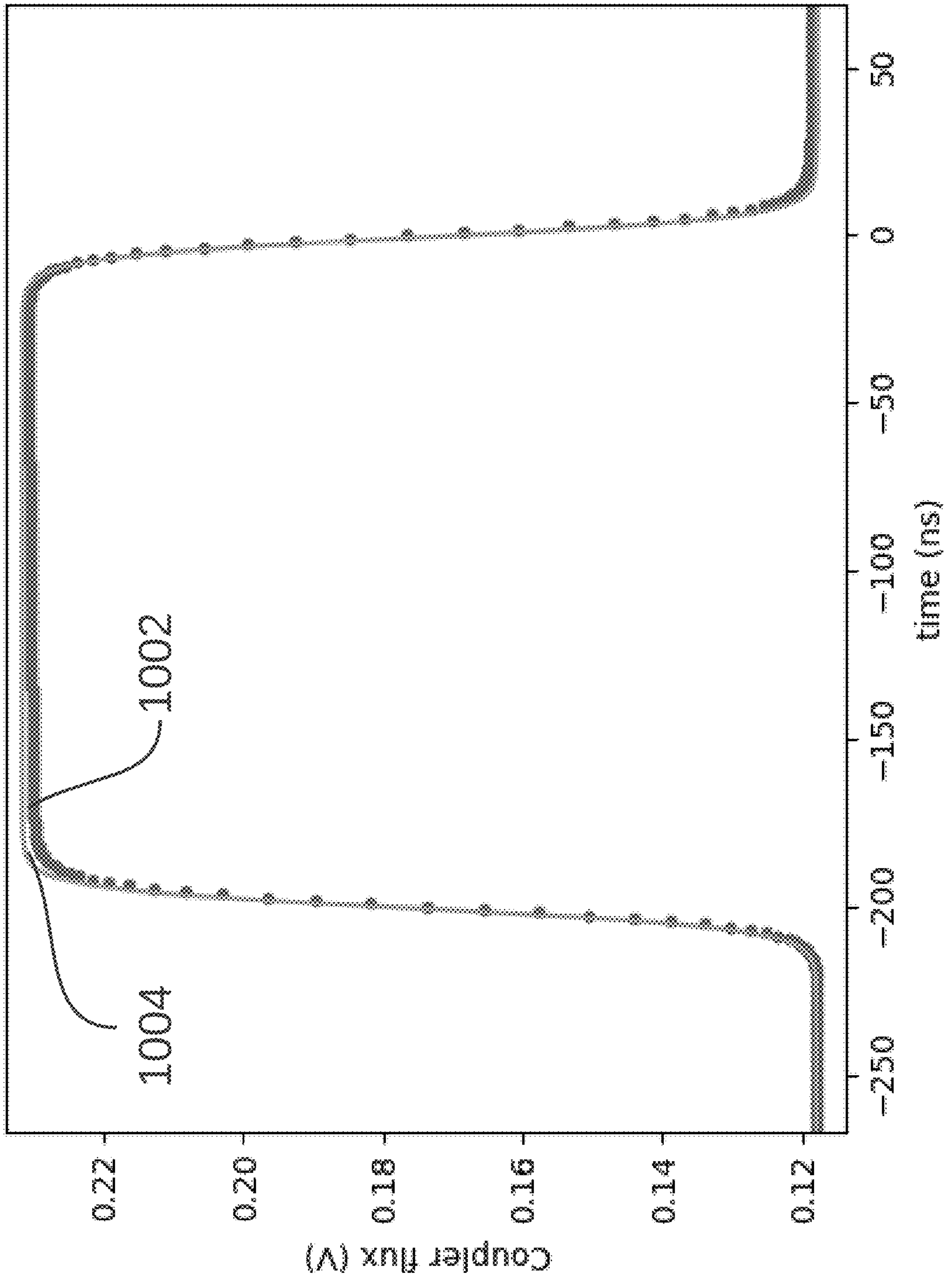
FIG. 10 is a graph showing an overlap of an expected coupler flux and a reconstructed coupler flux.

Flux pulse distortion refers to a difference between the expected value of the applied coupler flux pulse and the actual value of the applied coupler flux pulse. To determine the flux pulse distortion, the frequency of the qubit 102 is measured over time after a frequency-changing signal (i.e flux pulse signal) has been applied to the coupler 106 via the flux line 110C. It will be understood that a phase measurement may be performed, and that this is equivalent to a frequency shift. An example curve 900 of qubit frequency (y-axis) vs time (x-axis) as measured is shown in FIG. 9 for $f_q(t)$. The calibration curve 800 may then be used with the qubit frequency over time $f_q(t)$ to extract coupler flux over time ($V_c(t)$), which represents a reconstructed coupler flux over time and may be compared with an expected coupler flux over time. An example is shown in FIG. 10, where curve 1002 represents the reconstructed coupler flux and curve 1004 represents the expected coupler flux. The difference between curves 1002 and 1004 represents the coupler flux distortion and may be corrected (or compensated for) when selecting various gate parameters for quantum computations.

Figure 11:
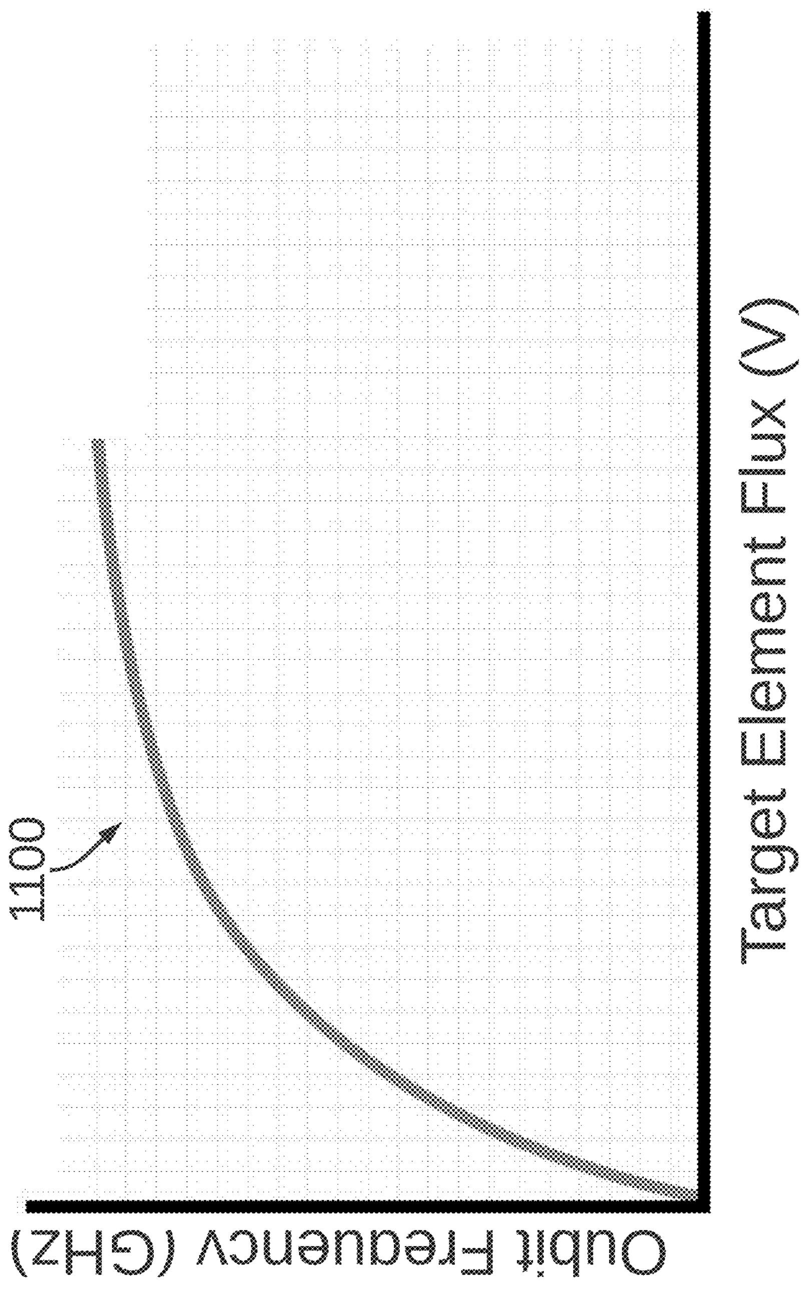
FIG. 11 is a graph showing qubit frequency vs target element flux.
Figure 12:
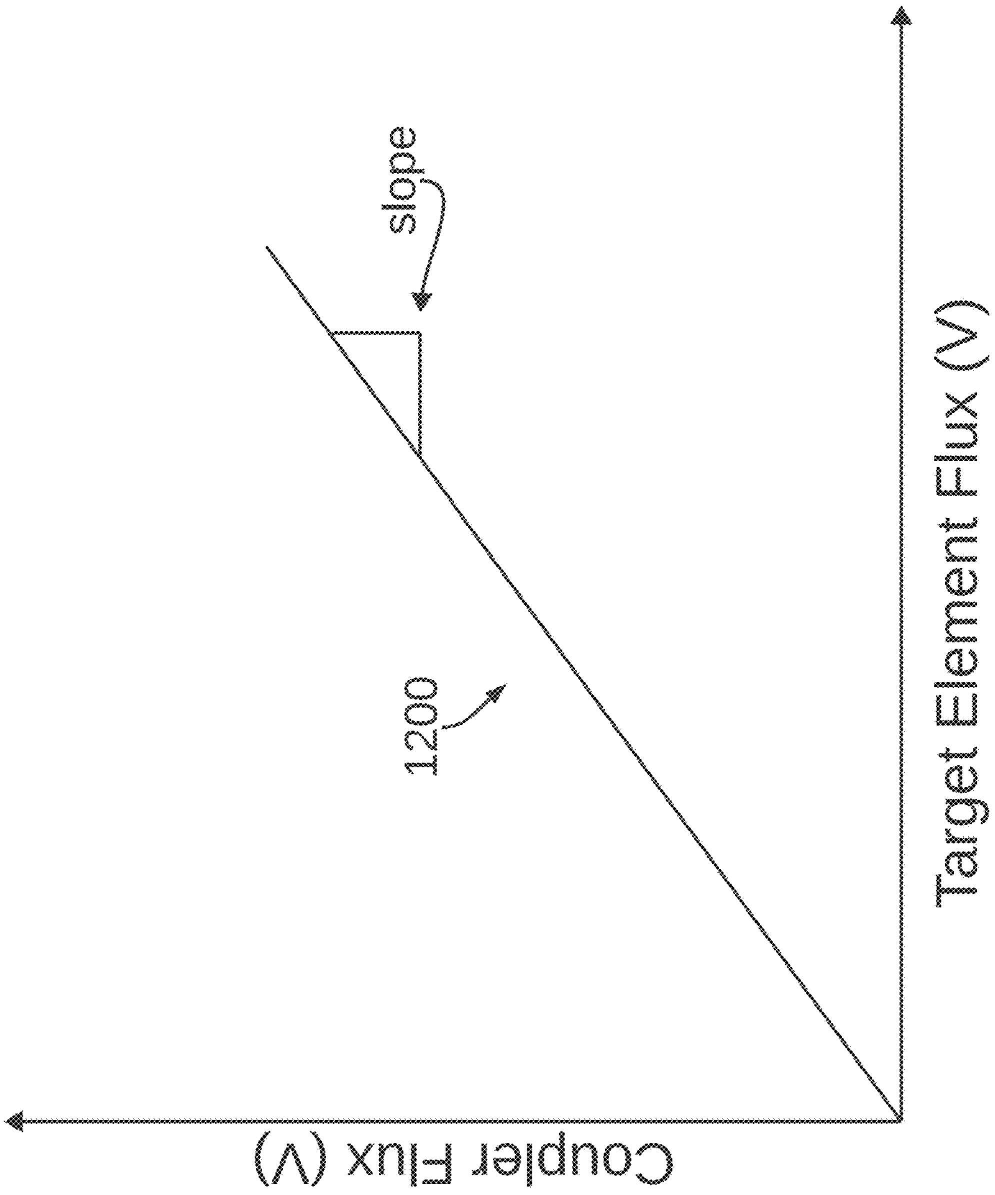
FIG. 12 is a graph showing coupler flux vs target element flux.

Flux crosstalk refers to a flux felt on the coupler from another source in the quantum circuit, for example another coupler or another qubit in the circuit. To determine flux crosstalk, the frequency of the qubit 102 is measured and mapped to a flux pulse applied to a target element. An example curve 1100 of qubit frequency (y-axis) vs target element flux (x-axis) is shown in FIG. 11. Using the calibration curve 800, and the curve 1100, curve 1200 as shown in FIG. 12 may then be determined, showing coupler flux (y-axis) mapped to target element flux (x-axis). The slope of curve 1200 corresponds to the crosstalk between the target element and the coupler. The crosstalk can be corrected or compensated for when selecting various gate parameters for quantum computations.

As will be understood, various other experiments performed within the context of calibration and characterization of quantum processors may benefit from the methods as described herein. Indeed, any one of coupler frequency, coupler population, coupler flux pulse distortion and flux crosstalk felt by the coupler may be used in various calibration and/or characterization experiments.

Figure 13:
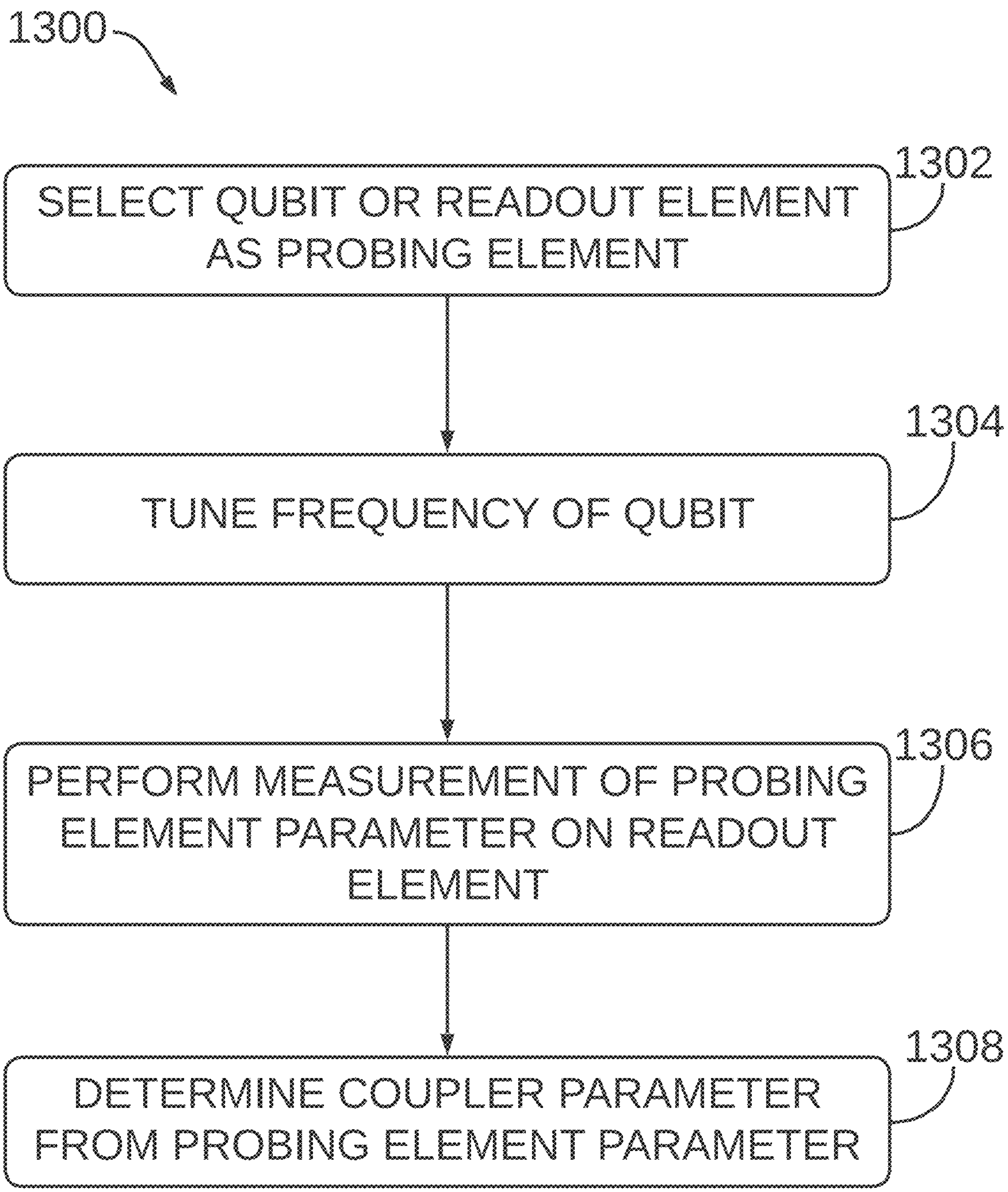
FIG. 13 is a flowchart of a method for determining a parameter of a coupling element in a quantum circuit.

FIG. 13 illustrates an example method 1300 for determining a parameter of a coupler in a quantum circuit, the quantum circuit comprising a qubit, the coupler, a readout resonator associated with the qubit and a readout transmission line associated with the readout resonator. The readout transmission line and readout resonator are collectively referred to as a "readout element". At step 1302, the qubit or the readout element is selected as the probing element. At step 1304, the frequency of the qubit is set to bring an effective coupling rate between the coupler and the probing element to at least a lower threshold of a strong coupling regime. At step 1306, a readout of a parameter of the probing element is performed on the readout element while the effective coupling rate between the probing element and the coupler is in the strong coupling regime. At step 1308, the parameter of the coupler is determined from the parameter of the probing element.

In some embodiments, the parameter is the quantum state of the coupler. In this case, determining the coupler parameter at step 1308 may comprise identifying a frequency of a magnitude and a phase component of a readout signal from the readout element the frequency being dependent on the quantum state of the coupler. For example, the ground state of the coupler may be associated with a first frequency for the phase and amplitude of a readout signal associated with the resonator, while the first excited state of the coupler may be associated with a second frequency for the phase and amplitude of the readout signal.

Figure 14:
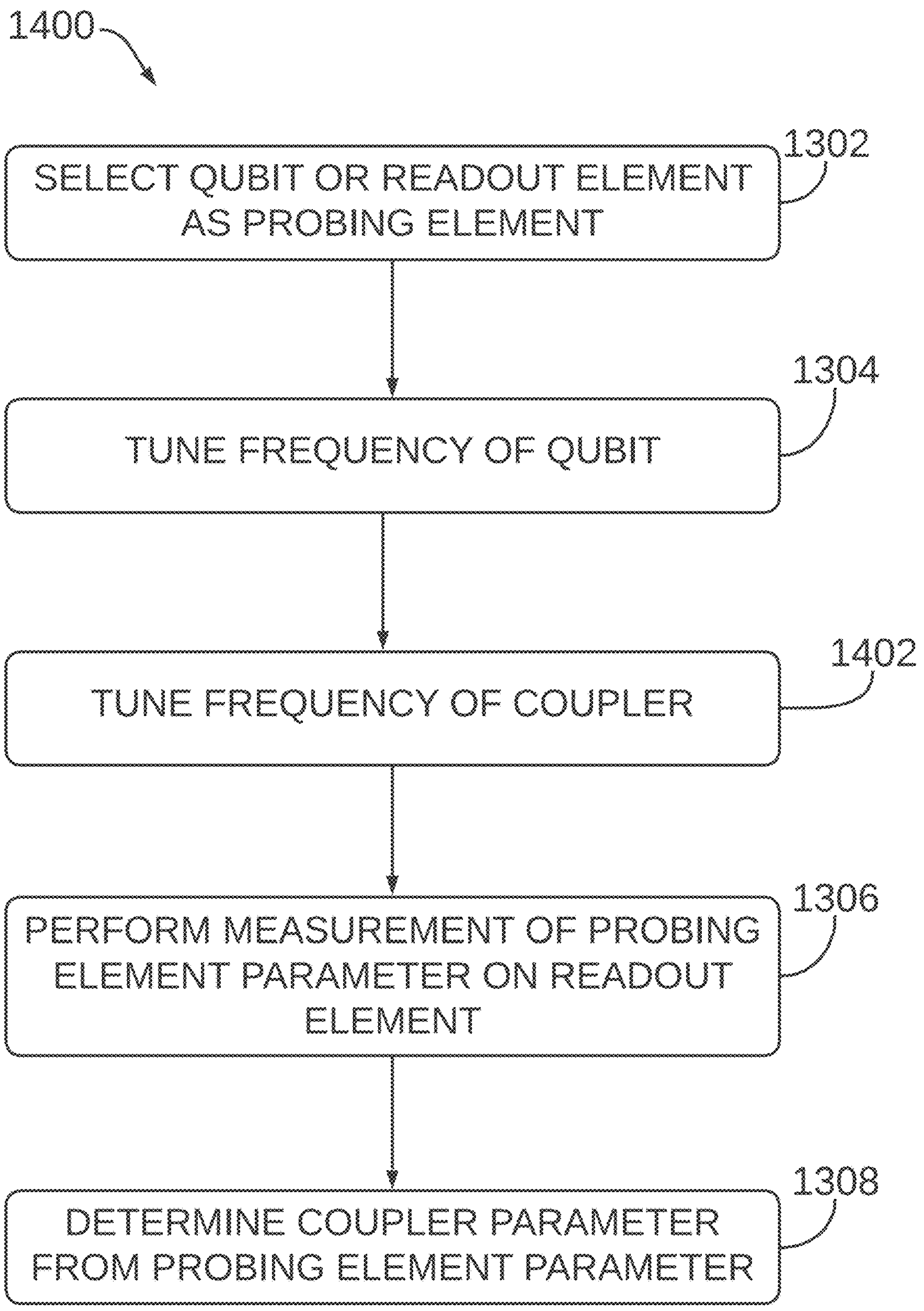
FIG. 14 is a flowchart of an example embodiment of the method of FIG. 13.

In some embodiments, a difference between the frequency of the resonator and the frequency of the coupler is set to be much greater than the effective coupling strength $g_{rc}$ (known as the dispersive regime) in order to avoid hybridizing the coupler quantum state with the resonator quantum state during readout. An example is shown in FIG. 14, where the frequency of the coupler is tuned at step 1402 to place the coupler and resonator in the dispersive regime. Steps 1304 and 1402 may be performed concurrently or iteratively such that suitable frequencies are set for the qubit and the coupler.

In some embodiments, the readout signal can be optimized by setting the frequency of the qubit at step 1304 to a value to obtain an optimal effective coupling rate between the coupler and the readout resonator. The optimal effective coupling rate depends on the dispersive shift $\chi$ of the readout resonator, given by:

$$\chi = \frac{-g_{rc}^2}{\Delta}\frac{1}{\left(1+\frac{\Delta}{\eta}\right)};$$

where $g_{rc}$ is the effective coupling rate between the coupler and the resonator, $\Delta$ is the frequency difference (also called detuning) between the coupler and the resonator, and $\eta$ is the anharmonicity of the coupler. The optimal effective coupling rate is found when the dispersive shift is half the decay rate of the resonator:

$$\chi = \frac{\kappa}{2}.$$

For a practical implementation of the coupler readout with a detuning of at least 200 MHz and $\kappa$~1 MHZ, the optimal effective coupling rate may be larger than 15 MHZ, such that the effective coupling rate between the coupler and the resonator is well above the strong coupling regime lower threshold. Other values may also apply.

In some embodiments, the parameter is the frequency of the coupler. In this case, the method further comprises applying a frequency-changing signal to the coupling element while the effective coupling rate of the readout resonator and the coupling element is in the strong coupling regime, and performing the readout on the readout transmission line comprises reading out an output at varying levels of the frequency-changing signal. An example is shown in method 1500 of FIG. 15. Steps 1302 and 1304 are the same as for method 1400. At step 1402, a frequency-changing signal is applied to the coupler. At step 1306, a readout of a parameter of the probing element is performed. Steps 1402 and 1306 are performed iteratively to obtain multiple sample points at different levels of the frequency-changing signal. In some embodiments, steps 1402 and 1306 are repeated for N iterations, where N is an integer greater than 2. In some embodiments, N is between 20 and 100. In some embodiments, N is between 20 and 60. In some embodiments, N is 30. N may also be less than 20 or greater than 100.

Once the N iterations have been performed, the coupler parameter, which in this case is the coupler frequency, is determined from the readout at step 1308. In some embodiments, determining the parameter comprises mapping resonator frequency as a function of the frequency-changing signal, and extracting the coupler frequency as a function of the frequency-changing signal by fitting a normal-mode splitting model. For example, the frequencies $f_{1,2}$ of the coupled resonator and coupler modes can be modelled as:

$$f_{1,2} = \frac{1}{2}\left(f_c + f_r \pm \sqrt{\Delta^2 + 4g_{rc}^2}\right);$$

where $f_c$ and $f_r$ are the frequencies of the uncoupled coupler and resonator, respectively, $g_{rc}$ is the effective coupling rate between the coupler and the resonator, and $\Delta$ is the frequency difference between the coupler and the resonator.

Figure 8:
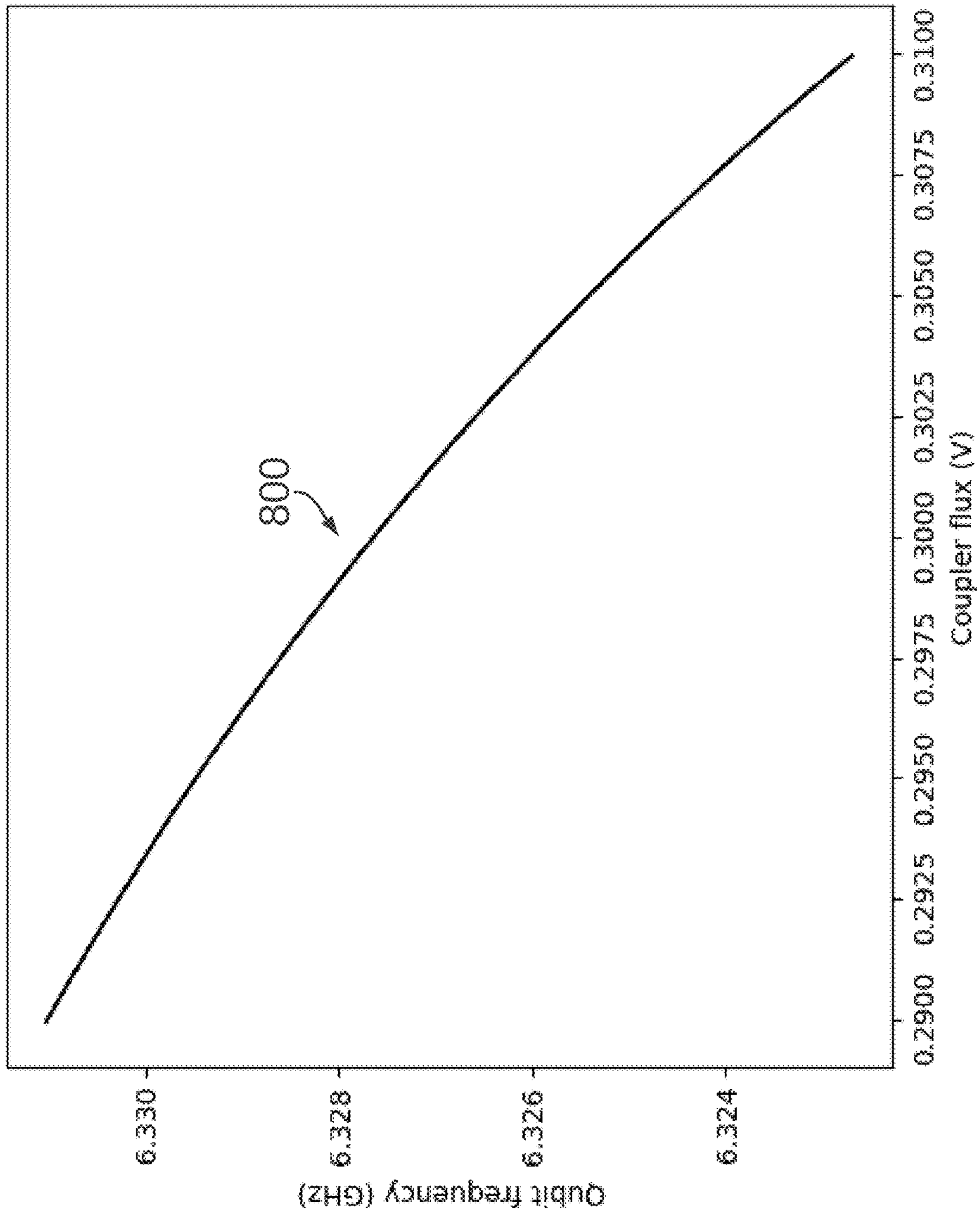
FIG. 8 is an enhanced portion of a curve from FIG. 7.

In some embodiments, and with reference to FIG. 14, step 1302 comprises selecting the qubit as the probing element, and step 1304 comprises tuning the frequency of the qubit to a detuning for which the qubit frequency is sensitive to the coupler frequency. At step 1402, the frequency of the coupler is tuned by applying a frequency-changing signal to the coupler, and a readout of the probing element parameter is performed at step 1306 by measuring the frequency of the qubit over time after the frequency-changing signal is applied. At step 1308, determining the parameter of the coupler may comprise reconstructing coupler flux over time using the frequency of the qubit and a calibration curve of the qubit frequency vs coupler, as shown in the example of FIG. 8.

Figure 16:
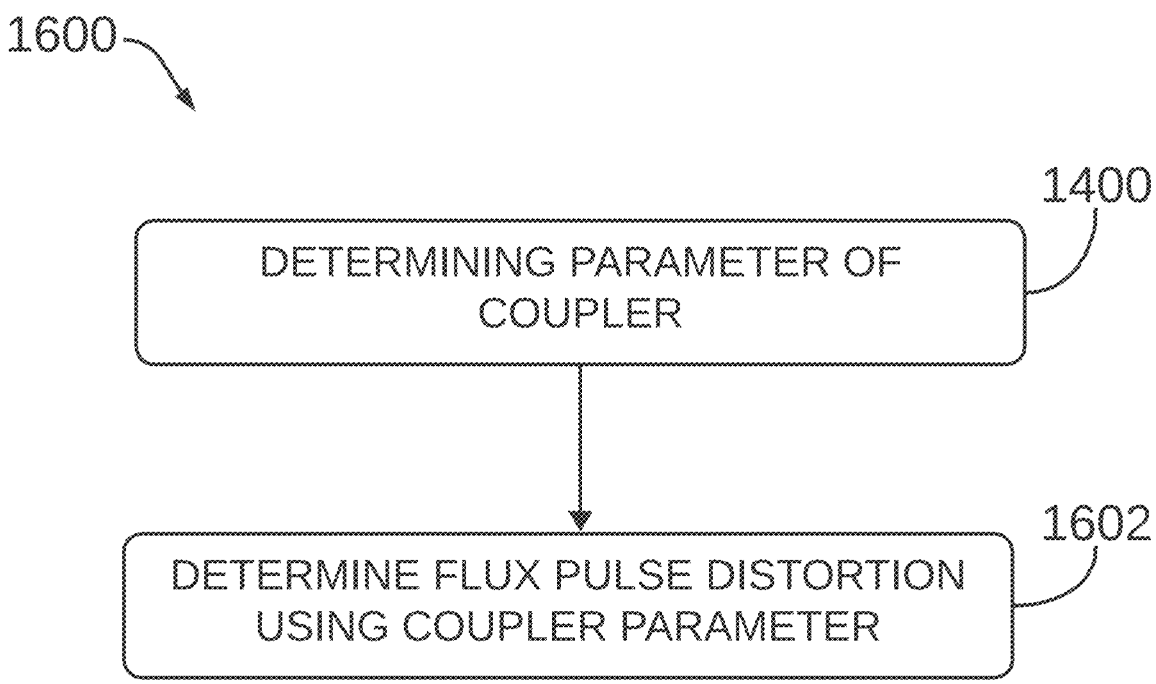
FIG. 16 is a flowchart of yet another embodiment of the method of FIG. 13.

In some embodiments, the parameter of the coupler may be used to determine flux pulse distortion for the coupler. An example is shown in FIG. 16, at method 1600. The outcome of the method 1400 is taken to determine flux pulse distortion at step 1602, by comparing the reconstructed coupler flux over time to an expected coupler flux over time. An example of the comparison is shown in FIG. 10.

Figure 17:
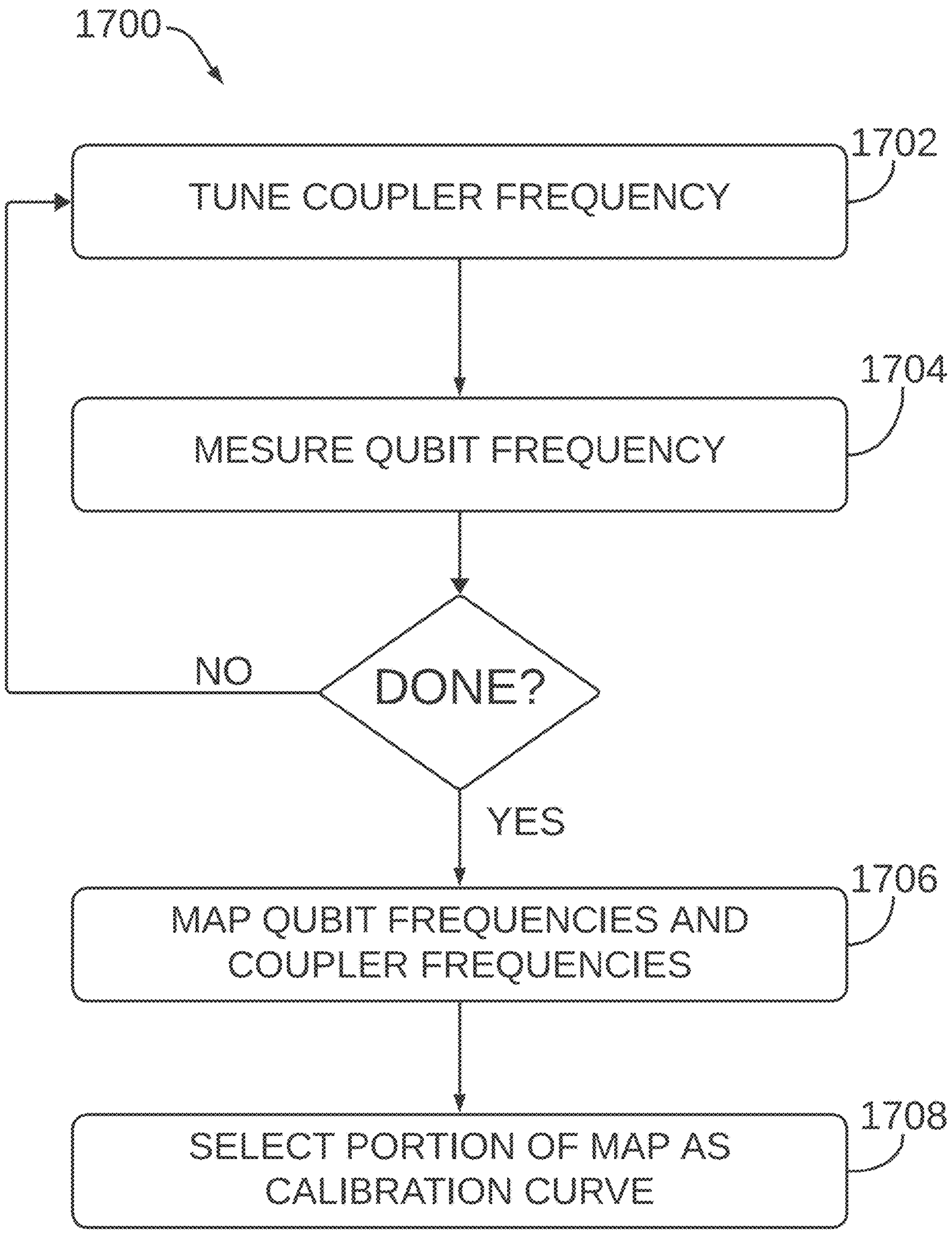
FIG. 17 is a flowchart of another embodiment of the method of FIG. 13.
Figure 18:
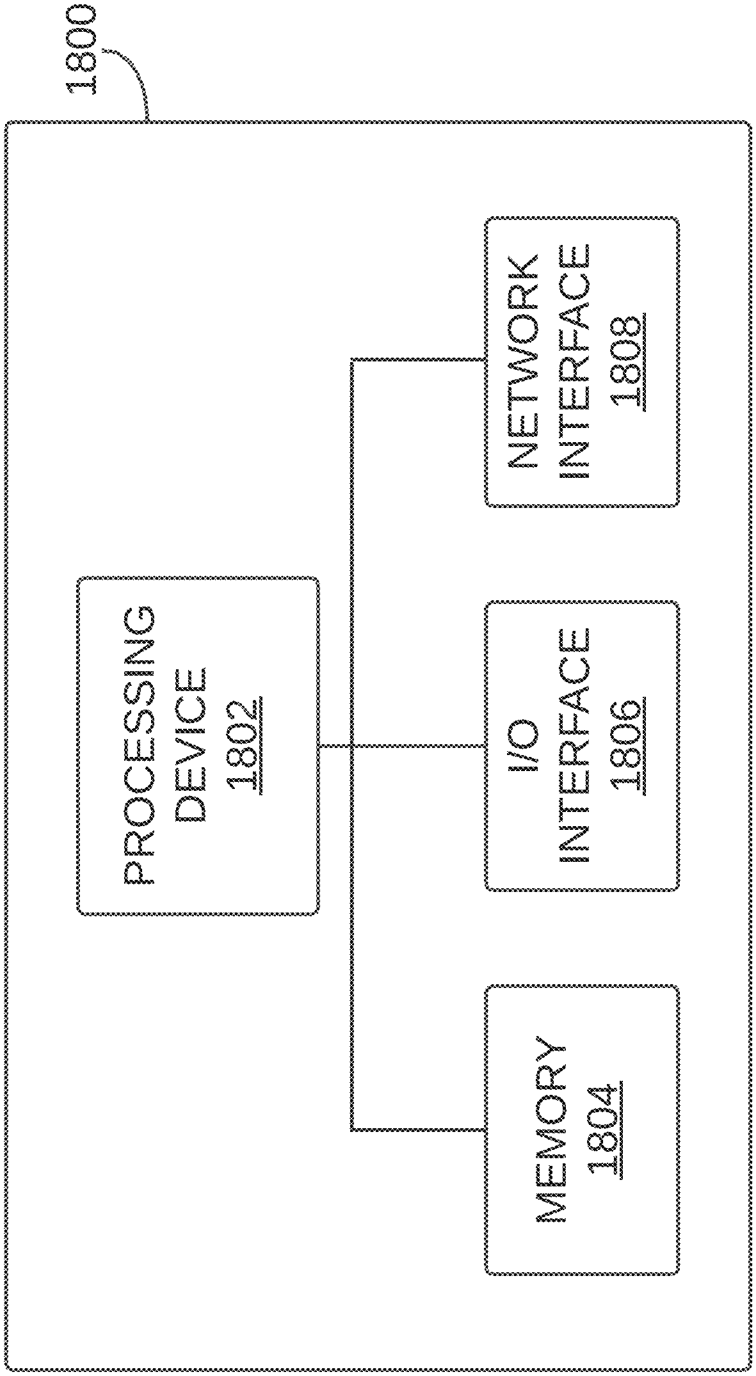
FIG. 18 is a block diagram of a system for determining a parameter of a coupling element in a quantum circuit.

Various approaches may be used to determine the calibration curve. FIG. 17 is an example embodiment of a method 1700 for establishing the calibration curve 1700. Steps 1702 and 1704 are performed iteratively by applying a plurality of frequency-changing signals to the coupler (step 1702) while the coupler and the qubit are in the strong coupling regime and measuring the corresponding qubit frequencies (step 1704) resulting from each of the frequency-changing signals. Once enough sample points are obtained, the qubit frequencies and corresponding coupler frequencies are mapped at step 1706. A portion of the curve from the mapping is selected as the calibration curve at step 1708. The selected portion should correspond to an instance where the sensitivity of the qubit frequency to changes in coupler flux is maximized. An example calibration curve is shown in FIG. 8.

Figure 15:
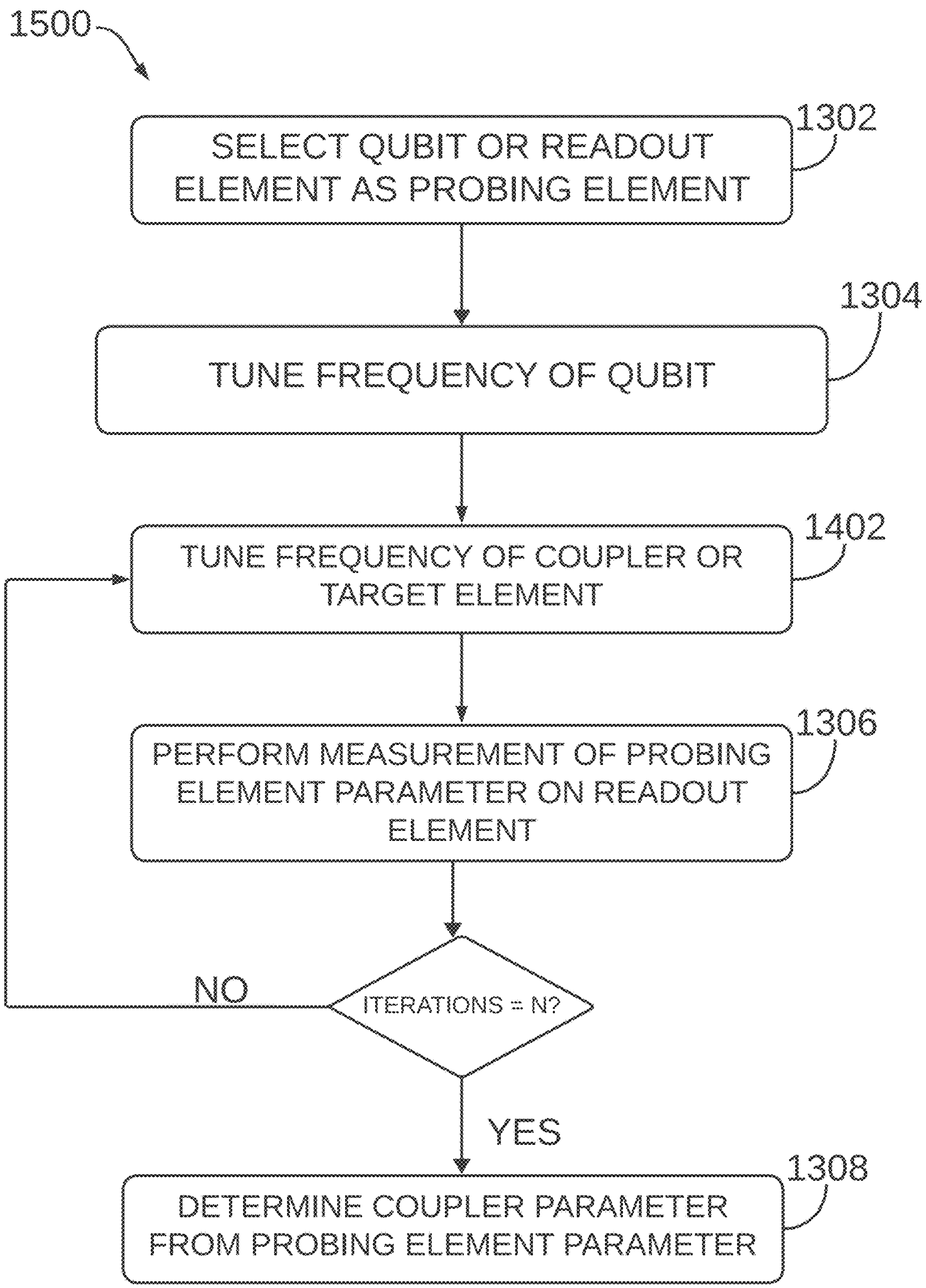
FIG. 15 is a flowchart of another example embodiment of the method of FIG. 13.

In some embodiments, and with reference to FIG. 15, when the qubit is selected as the probing element at step 1302, the parameter of the coupler determined at step 1308 may correspond to flux cross-talk from a target element in the quantum circuit, as felt by the coupler. The target element may be another qubit or another coupler in the quantum circuit. At step 1304, the frequency of the qubit is tuned change the detuning between the coupler and the qubit to ensure that the qubit frequency is sensitive to the coupler frequency. Steps 1402 and 1306 are performed iteratively by applying a plurality of frequency-changing signals to the target element (step 1402) and measuring the corresponding qubit frequencies (step 1306) resulting from each of the frequency-changing signals. After a sufficient number of sample points are obtained, the coupler parameter is determined at step 1308 by mapping qubit frequencies to target element frequencies, and extracting a mapping of coupler flux to target element flux using a calibration curve. The calibration curve may be found as per the example of FIG. 17. In some embodiments, the methods 1300, 1400, 1500, 1600, 1700 are embodied as a set of instructions stored on a non-transitory computer-readable medium. The instructions are executable by a processing device for determining the parameter of the coupler of a quantum circuit. FIG. 1800 is an example system 1800 for implementing the methods 1300, 1400, 1500, 1600, 1700 in accordance with various embodiments. The system 1800 can be provided as part of a classical computer that interfaces with a quantum processor. The system 1800 can also be provided as a set of control electronics that interface with a quantum processor.

As depicted, the system 1800 can include one or more of a processing device 1802, a memory 1804, an input/output (I/O) interface 1806, and a network interface 1808. The processing device(s) 1802 may be an Intel or AMD x86 or x64, PowerPC, ARM processor, or the like. In some embodiments, the processing device(s) 1802 is a field programmable gate array (FPGA) or an application specific integrated circuit (ASIC), provided on one or more board. Each memory 1804 may include a suitable combination of computer memory that is located either internally or externally such as, for example, random-access memory (RAM), read-only memory (ROM), integrated memory, compact disc read-only memory (CDROM). In some embodiments, both on-board high bandwidth memory and off-board memory are provided.

Each I/O interface 1806 enables the system 1800 to interconnect with one or more other devices, such as a host computer, a network switch, and the like. The I/O interface 1806 can be used, for example, for receiving instructions for the processing device 1802. Various communication protocols may be used for communicating with the system 1800 through the I/O interface 1806, such as but not limited to Peripheral Component Interconnect Express (PCIe), Ethernet, InfiniBand, and the like.

Each network interface 1808 enables the system 1800 to communicate with other components, for example, through an API to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others.

The described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for determining a parameter of a coupling element in a quantum circuit, the quantum circuit comprising a qubit, a coupling element coupled to the qubit, and a readout element associated with the qubit, the method comprising:

selecting the qubit or the readout element as a probing element;

tuning a frequency of the qubit;

performing a measurement of a parameter of the probing element on the readout element while an effective coupling rate of the probing element and the coupling element is in the strong coupling regime where an effective coupling rate between the coupling element and the probing element is greater than a decay rate or a relaxation rate of the probing element and a relaxation rate of the coupling element; and determining the parameter of the coupling element from the parameter of the probing element.

2. A method for determining a parameter of a coupling element in a quantum circuit, the quantum circuit comprising a qubit, a coupling element coupled to the qubit, and a readout element associated with the qubit, the method comprising:

selecting the readout element as a probing element;

tuning a frequency of the qubit;

performing a measurement of a parameter of the probing element on the readout element while an effective coupling rate of the probing element and the coupling element is in the strong coupling regime; and determining the parameter of the coupling element from the parameter of the probing element;

wherein tuning the frequency of the qubit brings an effective coupling rate between the coupling element and the readout element to at least the lower threshold of the strong coupling regime.

3. The method of claim 2, wherein the parameter of the coupling element is the quantum state of the coupling element.

4. The method of claim 3, wherein the parameter of the probing element is a frequency of a magnitude and a phase component of a readout signal from the readout element.

5. The method of claim 4, further comprising tuning a frequency of the coupling element to place the readout element and the coupling element in a dispersive regime prior to performing the measurement of the parameter of the probing element.

6. The method of claim 2, wherein the parameter of the coupling element is a frequency of the coupling element.

7. The method of claim 6, wherein performing the measurement of the probing element comprises measuring a frequency of the readout element and concurrently applying a plurality of frequency-changing signals to the coupling element.

8. The method of claim 7, wherein determining the parameter of the coupling element comprises mapping frequencies of the readout element as obtained from the readout to the frequency-changing signals applied to the coupling element and extracting the frequency of the coupling element from the mapping.

9. The method of claim 1, wherein selecting the qubit or the readout element as a probing element comprises selecting the qubit, and tuning the frequency of the qubit brings the qubit and coupling element to a detuning where the frequency of the qubit is sensitive to a frequency of the coupler.

10. The method of claim 9, wherein performing the measurement of the probing element comprises measuring the frequency of the qubit over time after a frequency-changing signal is applied to the coupling element, and determining the parameter of the coupling element comprises reconstructing coupler flux over time using the frequency of the qubit and a calibration curve of qubit frequency vs coupling element flux.

11. The method of claim 10, further comprising determining flux pulse distortion by comparing the reconstructed coupling element flux over time to an expected coupler flux over time.

12. The method of claim 10, further comprising establishing the calibration curve by:

applying a plurality of frequency-changing signals to the coupling element;

measuring qubit frequencies resulting from the plurality of frequency-changing signals;

mapping the qubit frequencies as measured to the plurality of frequency-changing signals; and selecting a portion of the mapping where a sensitivity of qubit frequency to changes in coupler flux is maximized as the calibration curve.

13. The method of claim 9, wherein the parameter of the coupling element is flux cross-talk from a target element in the quantum circuit to the coupling element.

14. The method of claim 13, wherein the target element is a second qubit in the quantum circuit.

15. The method of claim 13, wherein the target element is a second coupling element in the quantum circuit.

16. The method of claim 13, wherein performing the measurement of the parameter of the probing element comprises measuring a frequency of the qubit and concurrently applying a plurality of frequency-changing signals to the target element.

17. The method of claim 16, wherein determining the parameter of the coupler element comprises extracting a mapping of a flux of the coupling element to a flux of the target element using a mapping of the frequency of the qubit for the plurality of frequency-changing signals applied to the target element, and a calibration curve of qubit frequency vs coupling element flux.

18. The method of claim 17, wherein the flux crosstalk felt by the coupling element is a slope of a curve mapping the flux of the coupling element to the flux of the target element.

19. The method of claim 17, further comprising establishing the calibration curve by:

applying a plurality of frequency-changing signals to the coupling element;

measuring qubit frequencies resulting from the plurality of frequency-changing signals;

mapping the qubit frequencies as measured to the plurality of frequency-changing signals; and selecting a portion of the mapping where sensitivity of qubit frequency to changes in coupler flux is maximized as the calibration curve.

20. The method of claim 1, wherein the qubit is a superconducting qubit, and the coupling element has a superconducting qubit architecture.

* * * * *